M. NIEĆ.
UTENSIL LIFTER.
APPLICATION FILED JULY 30, 1914.
1,142,198.
Patented June 8, 1915.
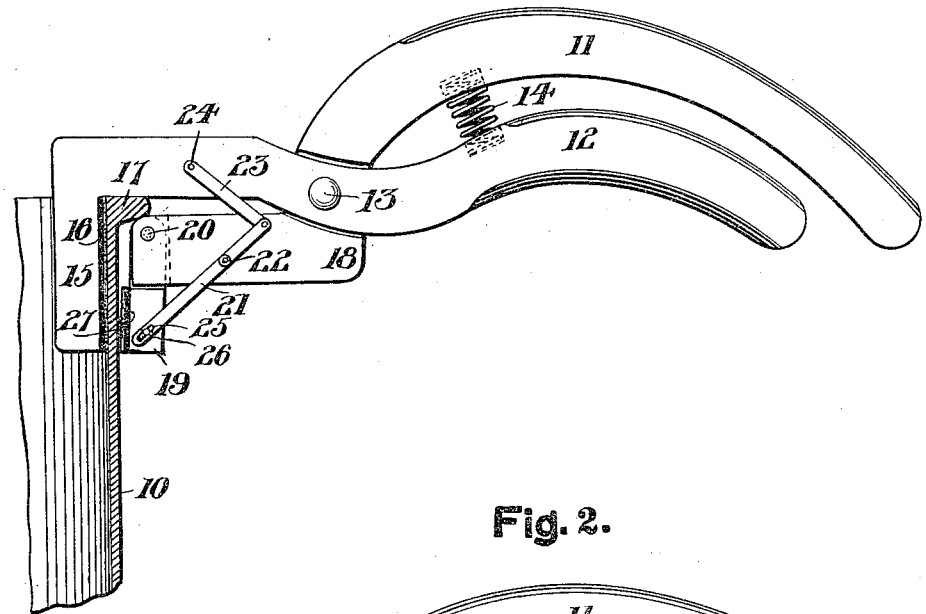
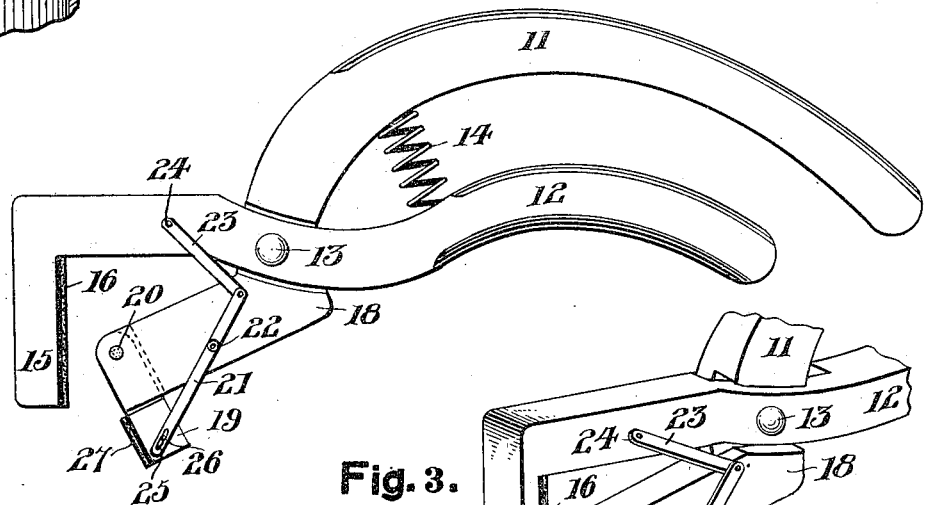
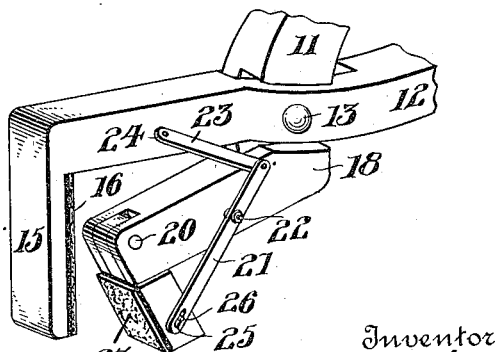
Witnesses
Inventor
Michael Nieć
By
Attorneys

UNITED STATES PATENT OFFICE.

MICHAEL NIEĆ, OF ST. CATHARINES, ONTARIO, CANADA.

UTENSIL-LIFTER.

1,142,198.  Specification of Letters Patent.  Patented June 8, 1915.

Application filed July 30, 1914. Serial No. 854,166.

*To all whom it may concern:*

Be it known that I, MICHAEL NIEĆ, a subject of the Emperor of Austria-Hungary, residing at St. Catharines, Ontario, Canada, have invented certain new and useful Improvements in Utensil-Lifters, of which the following is a specification.

This invention relates to certain new and useful improvements in utensil lifters.

The primary object of the invention is to provide a ready means for lifting utensils, such as cooking vessels when the same are excessively heated and without burning the hands of the operator.

A further object of the invention is to provide gripping handles having normally open jaws, one of which jaws is closable upon the work in advance of the other during the gripping operation.

A still further object is to provide heat insulated faces upon gripping jaws, the handles of which jaws are also formed of heat insulating material, one jaw being pivotally operable by means of a toggle actuating lever.

With these general objects in view and others that will appear as the nature of the invention is better understood, the same consists in the novel construction, combination and arrangement of parts hereinafter more fully described and then claimed.

In the accompanying drawings forming a part of this application and wherein like numerals of reference designate like parts throughout the several views, Figure 1 is a side elevation of the device positioned upon a utensil, only a portion of the latter being illustrated. Fig. 2 is a side elevation of the device detached and with the elements thereof normally separated, and, Fig. 3 is a perspective view of the pivoted jaw members with the handles thereof broken away.

Referring more in detail to the drawings, the device is herein illustrated in Fig. 1 as operatively engaging the utensil 10 and consists of a longer and a shorter curved handle 11 and 12 respectively, and preferably formed of wood or other heat insulating material, the said handles being pivoted together by means of a bolt 13 and normally separated by an expansion spring 14. The handle 12 is provided with an angularly-positioned jaw 15 having heat insulating material 16 upon its inner engaging face, the jaw being adapted to be inserted within the utensil with the facing 16 contacting the inner face therof and the arm resting upon the top bead 17 of the utensil.

The handle 14 is provided with an angular extension 18 adapted to bear beneath the bead 17 and is provided with a depending angularly-positioned jaw 19 pivoted to the free end thereof by the bolt 20. A link 21 is pivoted at 22 to the jaw 18 and has an arm 23 pivotally connected to the free end thereof and to the handle 12 at 24. The lever 21 is provided with a longitudinal slot 25 adjacent its free end and adapted for receiving the pin 26 of the pivoted jaw 19 slidably therein.

The handles and their jaws are normally held separated as illustrated in Fig. 2 by means of the expansion spring 14 while by placing the device over the rim or bead of the utensil, the handles may be forced together by the hand of the operator, thus closing the jaws upon the work and by means of the toggle lever and arm 21 and 23 respectively, the pivoted jaw 19 is forced into active contact with the upper face of the utensil while the jaw 18 engages beneath the bead thereof and the utensil is firmly grasped thereby. It is to be noted that the pivoted jaw 19 is provided with a heat insulated face 27 and the utensil is gripped between the faces 16 and 27. A lifter is thus provided that is readily attached to and detached from a heated article without burning the hands of the operator and one also that is light in weight and easy and inexpensive to manufacture.

While the forms of the invention herein shown and described are what are believed to be preferable embodiments thereof, it is nevertheless to be understood that various forms, modifications and arrangements of the parts as shown may be made without departing from the spirit and scope of the invention as claimed.

What I claim as new is:—

1. A lifter comprising curved handles pivotally-connected together, an expansion spring between said handles, an angularly-positioned jaw portion upon one of said handles, an angularly-positioned jaw upon the other of said handles, a pivoted jaw carried by said angular jaw, link connections between said angular jaw, pivoted jaw and angularly positioned jaw portion whereby the said angular and pivoted jaws are adapted to coöperate with the jaw portion of the said first-named handle.

2. A lifter comprising curved handles pivotally-connected together, an expansion spring between said handles, an angularly-positioned jaw portion upon one of said handles, an angularly-positioned jaw upon the other of said handles, a pivoted jaw carried by said angular jaw, a lever carried by said angular jaw and having a slotted connection with said pivoted jaw, and an arm pivotally-connecting the free end of said lever and said jaw portion of the first-named handle whereby a closing of the pivoted jaw and of the handle jaw is simultaneously effected.

In testimony whereof I affix my signature in presence of two witnesses.

MICHAEL NIEĆ.

Witnesses:
E. L. LUTHER,
BRONISLAU BRÓLIKORSKI.

Copies of this patent may be obtained for five cents each, by addressing the "Commissioner of Patents, Washington, D. C."